United States Patent [19]

Troyer

[11] 4,323,113
[45] Apr. 6, 1982

[54] UNDERGROUND AIR TEMPERING SYSTEM

[76] Inventor: LeRoy S. Troyer, 3019 Essex, South Bend, Ind. 46615

[21] Appl. No.: 202,587

[22] Filed: Oct. 31, 1980

[51] Int. Cl.³ .............................................. F24J 3/02
[52] U.S. Cl. ...................................................... 165/45
[58] Field of Search ........................... 165/45, DIG. 4; 126/400

[56] References Cited

U.S. PATENT DOCUMENTS

| | | | |
|---|---|---|---|
| 706,451 | 8/1902 | Rector | 165/45 |
| 1,974,244 | 9/1934 | Lapp | 165/45 |
| 2,119,038 | 5/1938 | Bell | 165/45 |
| 2,217,190 | 10/1940 | Urquhart | 165/45 |
| 2,427,780 | 9/1947 | Haines | 165/45 |
| 2,793,509 | 5/1957 | Keen | 165/45 |
| 3,424,232 | 1/1969 | Garrett | 165/45 |
| 4,024,910 | 5/1977 | Werner | 165/45 |
| 4,051,891 | 10/1977 | Harrison | 126/400 |
| 4,106,555 | 8/1978 | Quintal | 165/45 |
| 4,205,656 | 6/1980 | Scarlata | 126/400 |
| 4,234,037 | 11/1980 | Rogers et al. | 165/45 |

FOREIGN PATENT DOCUMENTS

| | | | |
|---|---|---|---|
| 475226 | 2/1915 | France | 165/45 |
| 1089865 | 3/1955 | France | 165/45 |
| 248161 | 1/1948 | Switzerland | 165/45 |

Primary Examiner—Sheldon J. Richter
Attorney, Agent, or Firm—Marmaduke A. Hobbs

[57] ABSTRACT

An underground air tempering system for warming the supply air to a building in the winter and cooling the supply air in the summer in which a heat exchanger containing heat transfer material is disposed beneath the surface of the ground and the air supply to the building is drawn through the heat exchanger to be tempered by the substantially constant ground temperature. Two or more heat exchangers may be interconnected on the air supply and air distribution ends for supplying a sufficient volume of tempered air to large buildings. The underground air tempering system cleanses the air by removing dust and other particles therefrom, and moderates the humidity of the air by warming and humidifying cold dry winter air and by cooling and dehumidifying hot moist summer air. To maintain free flowing air passages, and to eliminate fungal and bacterial growth in the heat exchanger, a disinfectant and wash solution system is disposed above the heat transfer material for periodic cleansing of the material.

24 Claims, 6 Drawing Figures

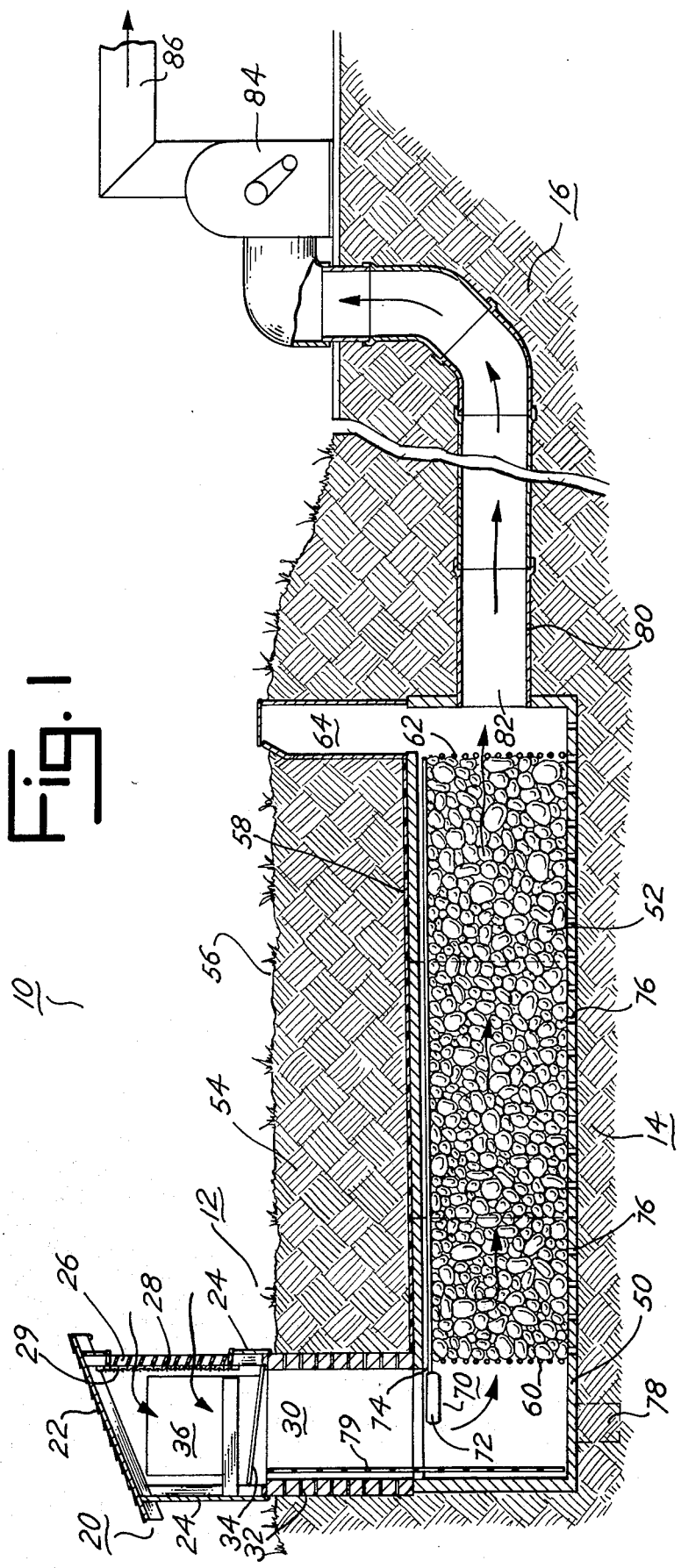

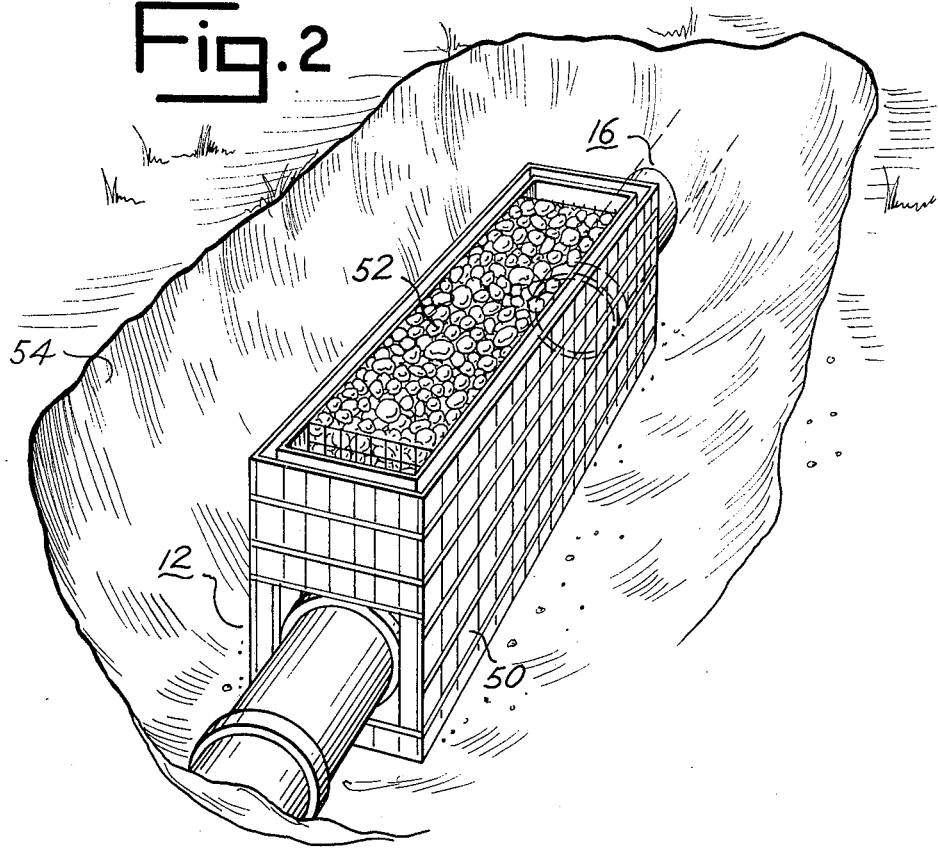
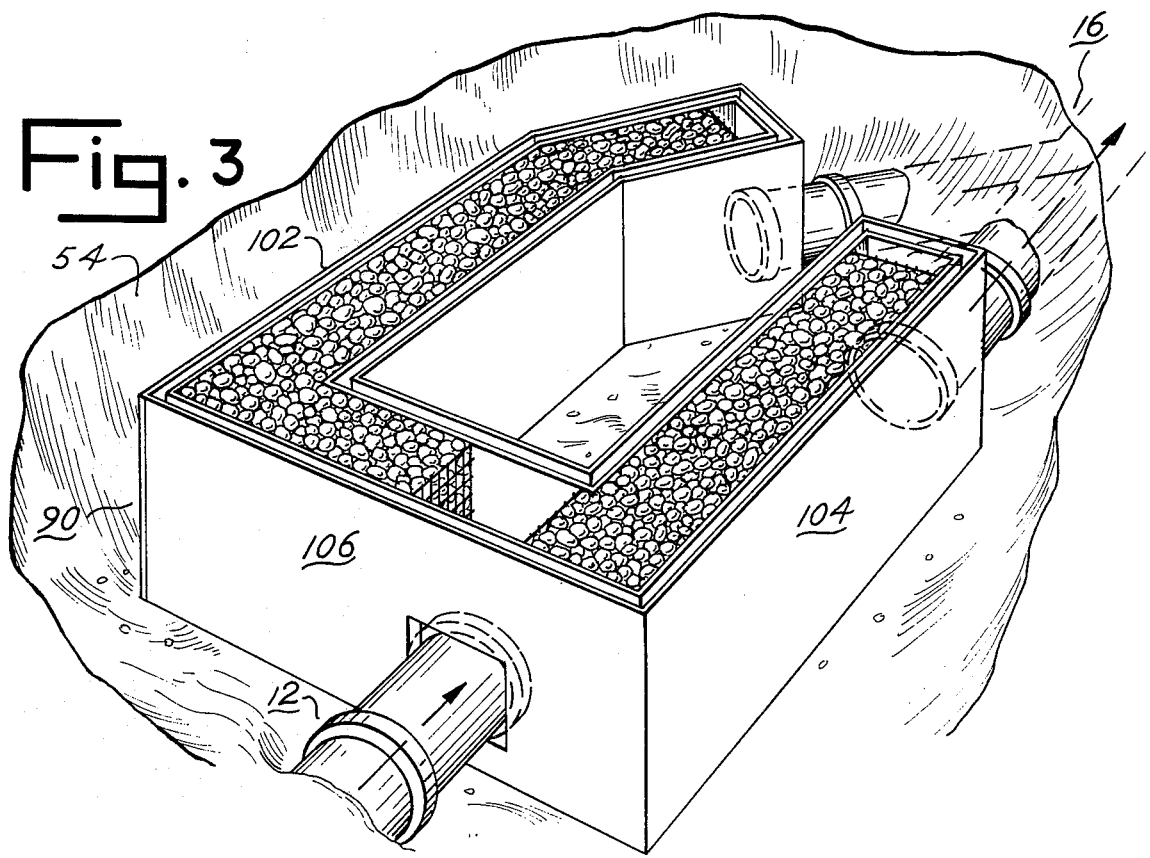

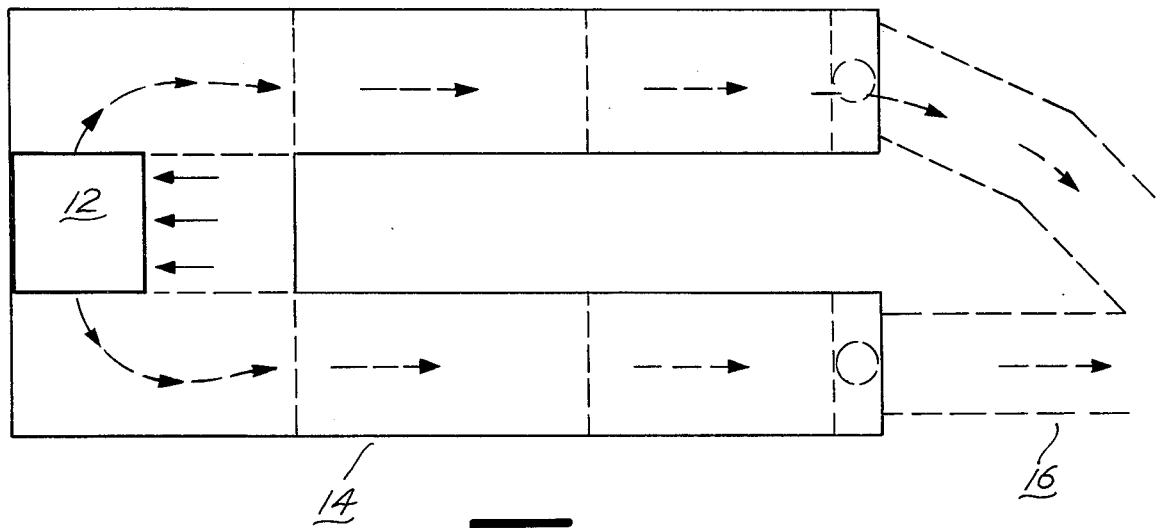
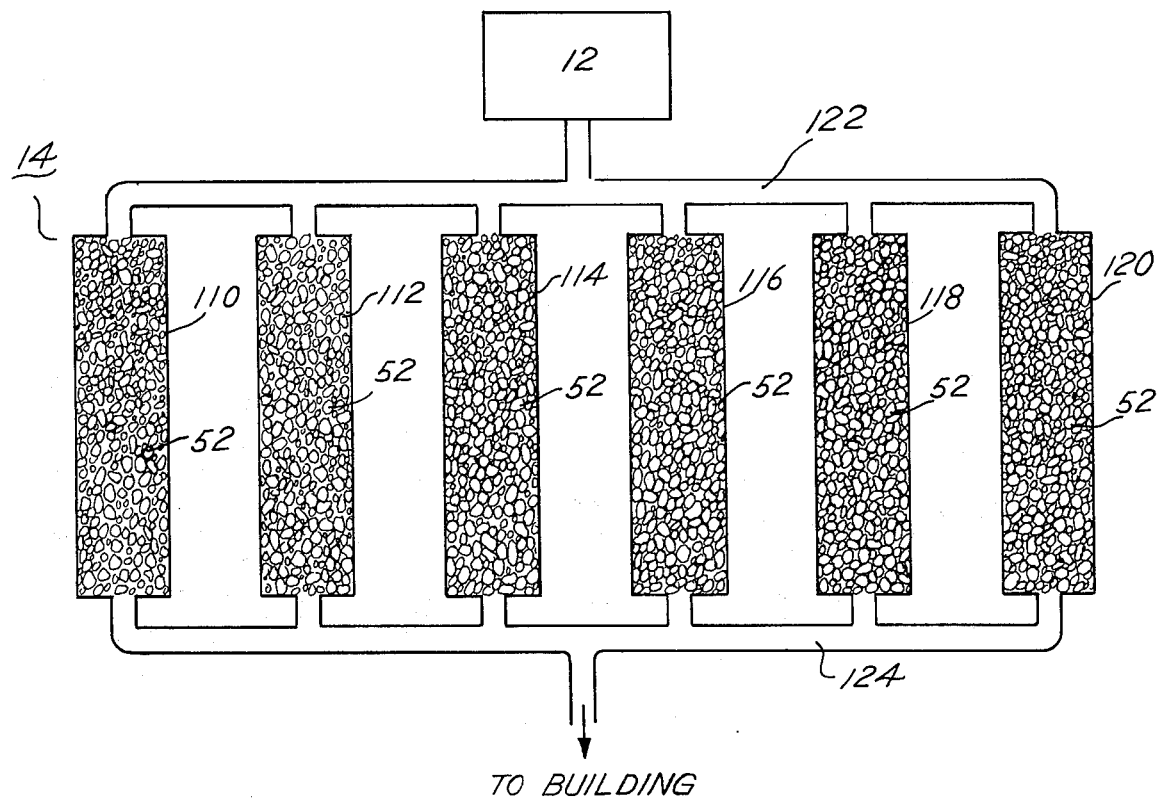

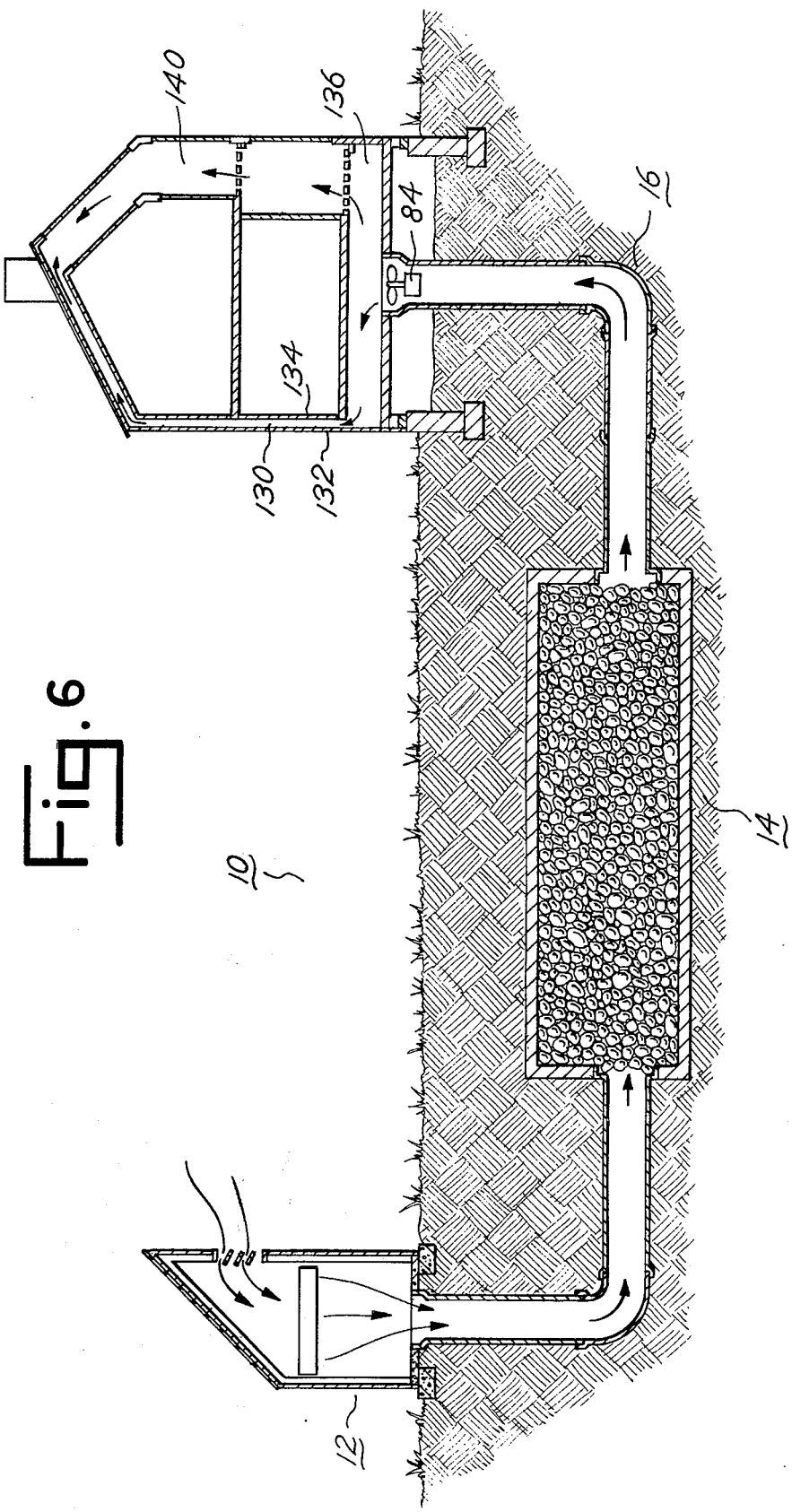

UNDERGROUND AIR TEMPERING SYSTEM

BACKGROUND OF THE INVENTION

A substantial portion of the total amount of energy consumed annually is used for heating and cooling of buildings, including homes, factories, office buildings and the like. As a result of the tremendous increases in energy costs, it has become cost effective on a long term basis to invest larger sums of money in energy conservation than it was in the past when energy was relatively inexpensive. Architects and engineers have become aware of this fact, and previously unused or little used technology for the more efficient use of natural energy resources, such as active or passive solar heating and the increased use of old technology such as building insulation, can be economically incorporated in virtually any building when the long range cost savings therefrom are considered. Solar collectors to harness the energy from the sun have been developed and altered, made complicated and simplified, with predictably mixed results, particularly in severe climates and in areas which experience extended periods of cloudiness or overcast skies. One of the principal difficulties with the use of previous solar energy systems for heating buildings is that, in addition to the large initial installation cost, the systems generally require direct, intense sunlight. The rays from the sun are most indirect, and thus most inefficient, during the coldest months of the year when heating is required in a building, and the rays are most direct, and hence most heat creative for a solar heating system, during the summer months when typically the requirement is for cooling a building. Previous solar systems do not work well during cloudy or overcast days, and without storage systems, may cease operating entirely if prolonged absences of direct sunlight occur.

The largest and most reliable solar energy collector available to mankind is the earth itself. It has long been known that subsurface ground temperatures below the frost line are relatively stable. At a depth of 10 to 12 feet below the ground surface in most temperate zone locations, a relatively constant ground temperature of 55° is present. Heating and cooling of the ground at more shallow depths do occur; however, the rate at which temperatures at the surface of the ground penetrate into the ground in slow. Hence, the highest subsurface soil temperatures are reached during the late fall and early winter months when above ground temperatures approach the coldest, and the coolest subsurface temperatures are present during the late spring and early summer months when the above surface temperatures are approaching the warmest. This phenomenon, whereby the subsurface temperature cycle is out of phase with the above ground temperature cycle, is referred to as a "thermal fly wheel" effect, and manifests itself to a small degree in temperature fluctuations between day time and night time as well as between warm months and cold months. Hence, the earth as a solar collector functions opposite to conventional above ground solar collectors which rely on direct sunlight for operation, in that the earth reaches its warmest temperatures when heating would be required in buildings and the earth is at its coolest temperature when cooling is required.

SUMMARY OF THE INVENTION

Especially in areas which experience large average temperature variations from month to month, wherein summer temperatures approach 100° F. and winter temperatures plunge to below 0° F., significant energy savings can be obtained by tempering the makeup air to be used in heating and cooling systems for buildings at minimal energy expense. It is therefore one of the principal objects of the present invention to provide an underground air tempering system which utilizes the natural temperature buffer present below the earth's surface to warm the makeup air for building heating systems during cool weather at an energy expenditure substantially below the cost for conventionally heating the air to similar temperatures, and which will cool the makeup air for building cooling systems during warm weather at substantial energy savings over conventional air cooling methods.

These and other objects are accomplished in the present invention by providing an underground housing or series of housings disposed at a depth where constant ground temperatures are present, or where temperature variations are present only in a fly wheel effect. The housings are filled with rocks or other material to serve as heat exchangers, and the air to be used as makeup air in the building is drawn through the heat exchangers. The air drawn therethrough may comprise 100% fresh makeup air, 100% return or exhaust air from the building, or any variation of a combination of fresh makeup air and return air. The air is warmed during cold months and cooled during hot months to substantially reduce the burden on conventional heating and cooling equipment. A fan or blower is the only energy consuming component in the present system and will normally be of similar size to the air handler required by conventional heating or cooling systems in similar buildings. Thus the cost for moving the air in the present invention is the same as in previous heating or cooling systems; however, the present system consumes no energy in performing the actual temperature modifications as do the previous systems. The housing containing the rocks is normally waterproofed, and a sprayer system to clean and disinfect the rocks or other material to prevent fungal and bacterial growth is disposed at the top of the material with a sump pump and drainage system disposed therebelow.

Another object of the present invention is to provide an underground air tempering system which can be installed in a cost efficient manner so that the installation cost thereof can be returned in energy savings over a short period of time, and which can be used as a supplement to most conventional heating or cooling systems.

A further object of the present invention is to provide an underground air tempering system which will provide humidity control to some degree, to reduce the humidity content of the building makeup air during the summer cooling months, and to increase the humidity content thereof during winter heating months, and which will perform the additional function of filtering and cleansing the makeup air to provide substantially clean air for the climate control system of a building.

Yet another object of the present invention is to provide an underground air tempering system which has only a few moving parts and requires only minimal maintenance for the upkeep thereof, and which has little or no environmental impact during either installation or use.

Still another object of the present invention is to provide an underground air tempering system which can be used with other energy saving construction techniques, such as for example, envelope building construction, and which will not interfere with the aesthetic design of buildings or surrounding grounds of buildings.

Additional objects and advantages of the present invention will become apparent from the following detailed description and the accompanying drawings.

BRIEF DESCRIPTION OF THE DRAWINGS

FIG. 1 is a vertical cross sectional view of the present underground air tempering system;

FIG. 2 is a perspective view of an embodiment of the present invention suitable for use with a small building having relatively small volume makeup air requirements;

FIG. 3 is a perspective view of a larger embodiment of the present invention then that shown in FIG. 1, for use in a larger building having larger volume makeup air requirements;

FIG. 4 is a top plan view of a medium size underground air tempering system, indicating the air flow patterns therethrough;

FIG. 5 is a diagrammatical view of an underground air tempering system which may be modified as required for large buildings having large volume makeup air requirements; and FIG. 6 is a vertical cross sectional view showing one particularly advantageous use of the present underground air tempering system.

DETAILED DESCRIPTION OF THE PREFERRED EMBODIMENT

Referring now more specifically to the drawings, and to FIG. 1 in particular, numeral 10 designates an underground air tempering system embodying the present invention which may be used with virtually any building, from single family residential dwellings to public buildings, including restaurants, churches and the like, as well as factories, office buildings, farm buildings, such as poultry and hog sheds or cattle barns, or any building which requires some degree of interior climate control. The present system is useful during cold weather when heating is required and can substantially reduce the energy cost for heating a building, and the present system is also useful during warm weather when cooling is required for interior building spaces. In some applications the present system can entirely replace conventional centralized air conditioning systems, and will totally preclude the need for compressors and outdoor fan units used with conventional centralized air conditioning. The present system may also be used as a supplement to centralized air conditioning, and will substantially reduce the energy expenditures in cooling a building. Exceptional energy savings can be realized when the present underground air tempering system is used for cooling particularly warm areas, such as the interiors of kitchens in restaurants and the like.

Underground air tempering system 10 is generally comprised of an air mixing and supply section 12, a heat exchanger 14 connected to and receiving air from supply section 12, and a tempered air distribution network 16 through which the tempered air is brought into the building makeup air system. As mentioned previously, the present air tempering system may be used for both small and large buildings; however, the basic construction and principles of operation are the same regardless of the volume of air to be processed therein. Smaller and larger embodiments will be more fully described hereinafter.

Air mixing and supply section 12 includes an air intake structure which, in the embodiment shown, is a small building or shed 20 through which fresh outside makeup air enters the system. Building 20 is an enclosed structure having a roof 22 and walls 24, with an air inlet opening 26 in one of the walls, which normally will have louvers 28 to prevent rain and large debris such as leaves and sticks from entering building 20. A screen 29 disposed behind louvers 28 prevents smaller contaminants from entering the building. The building is disposed over an air shaft 30 which extends from the ground surface downwardly to heat exchanger 14. Walls 32 of shaft 30 may be of any suitable material; however, poured concrete sections and/or concrete blocks have been found suitable while providing easy installation. Building 20 has no base or bottom floor, but opens directly into shaft 30 so that air entering the building will pass therethrough and down shaft 30 to heat exchanger 14. Filters and/or screens 34 are disposed over the opening to shaft 30 to further cleanse the air entering the tempering system. In some applications, the return air from the building climate control system may be brought into the air mixing and supply section 12 by appropriate ducts, and an air mixing box 36 of conventional design may be used to vary the mixture of fresh makeup air and return air which is permitted to pass into shaft 30. It should be understood that, although in some applications the air intake structure will be a separate building as shown in the drawings, in many instances the intake structure will consist of a vent and ducts in the building being supplied with air from the present tempering system, and the air mixing box 36, filters 34 and the like will be disposed in mechanical equipment spaces within the building, with ducts and an air shaft or shafts to the heat exchanger.

Heat exchanger 14 is comprised generally of a housing 50 filled with a heat transfer material 52. Housing 50 is disposed in the ground 54 at a depth at which the temperature is relatively constant or at which the usable thermal fly wheel effect is present. Normally the distance from the ground surface indicated by numeral 56 to the top of housing 50 will be approximately five (5) to six (6) feet; however, this distance may vary, depending on the location of the system and the desired performance of the system. The distance between surface 56 and the bottom of housing 50 will be twelve (12) feet in a typical installation for a medium size system; however, again this distance may vary depending on many factors, including the volume of air required from the system which will affect the desired cross sectional area of housing 50. Concrete has been found to be a suitable material for housng 50, and septic tank sections with the ends thereof removed when placed end to end provide a simplified installation technique. The lids of the septic tanks are used to cover the housing after the heat transfer material 52 has been placed therein. If a segmented installation technique using septic tanks or other sectional materials is used, the joint between the sections should be adequately sealed to prevent water seepage, and known asphalt, felt and asphalt cement sealing techniques may be used. As an alternative to the segmented type of installation, housing 50 may be formed from poured concrete or other suitable material; however in most types of installation, it is preferred that a vapor barrier 58 be disposed on the top and sides of housing 50. Six mil plastic vapor barrier has been found to perform satisfactorily. When conditions are present which require the introduction of moisture to the air in the system, the vapor barrier can be eliminated.

The heat transfer material indicated by numeral 52 is disposed in housing 50 and substantially fills the housing, to increase the surface area which the air will contact to facilitate heat transfer between the air and the material. A variety of materials may be used for heat transfer material, including waste or other masonary units such as crushed brick, rubble stone, field stone and construction and industrial waste such as steel and glass. A particularly efficient heat exchanger can be made using a plurality of vessels containing liquid such as water. Rocks are also suitable and generally are readily available. To perform satisfactorily, the heat transfer material must be of small enough size to substantially increase the surface area available for air contact in the housing, but must not be so small as to pack tightly and excessively restrict the passage of air through housing 50. It has been found that if rocks or the like are used, the rocks should be approximately four (4) to six (6) inches in diameter, to provide a suitable compromise by substantially increasing the surface area yet not packing so tightly as to substantially restrict the air flow in housing 50. Housing 50 is provided with grills 60 and 62 at the air inlet and outlet ends, respectively, consisting of steel bars to hold the heat transfer material 52 in housing 50. At the opposite end of housing 50 from shaft 30 a manhole access 64 may be provided.

It is desirable to minimize or eliminate fungal and bacterial growth which may occur in the heat transfer material from the moist incoming air after an extended period of time. For this reason dolomite rocks have been found to be a preferred type of heat transfer material, in that bacterial growth is somewhat inhibited by dolomite rocks. A wash system 70 is provided to clean dirt or dust which may accummulate on the heat transfer material, restricting the flow of air through the material, and to spray antifungal and antibacterial solutions on the material to eliminate potentially hazardous growths. Wash system 70 includes a supply tank 72 and a plurality of perforated wash lines 74 disposed above material 52 and positioned sufficiently close to adequately cover the top of the material with spray. The bottom of housing 50 contains a plurality of weep holes 76 to drain the wash solution from housing 50. When excavating for the installation of housing 50, sufficient depth should be obtained to permit the deposit of a layer of about six (6) inches of crushed gravel or other granular base beneath the housing to drain the wash solution. A sump pump 78 and any suitable sump drainage system may be used, and it is desirable to slope housing 50 slightly toward the location of the sump. In some applications a gravity drain will provide sufficient drainage from the housing. A ladder 79 is disposed in shaft 30 to provide access to the sump pump 78 and wash system 70 for periodic maintenance and inspection.

Tempered air distribution network 16 includes a duct 80 extending from an opening 82 in housing 50 to the building to be supplied with air from system 10. An air handler 84 draws the air from system 10 and distributes the air to the ventilation system 86 in the building. Air handler 84 pulls the air through system 10 all the way from louvers 28 in opening 26, through shaft 30, heat exchanger 14 and the distribution network 16.

In the use and operation of an underground air tempering system embodying the present invention, air handler 84 pulls air from the system and distributes it to building ventilation system 86. Air enters the air intake structure, such as building 20, through opening 26 and is cleansed by filters or screens 29 and 34. If return or exhaust air is also brought into the air intake structure, a suitable mixture of return air and fresh outside makeup air is made by air mixing box 36. The air is drawn down shaft 30 and through grill 60 into housing 50. As the air is pulled between the heat transfer material 52, heat transfer occurs between the air and the material. The large surface area and small air passages through the material provide an efficient heat transfer. As is known in thermodynamics, heat transfer occurs from a body of higher temperature to a body of lower temperature. Thus, during the summer months when warm exterior air is brought into housing 50 the heat is transferred from the air to the heat transfer material in the housing, causing the air temperature to drop. During the winter when cold air is brought into housing 50 heat is transferred from the heat transfer material to the air, causing the air temperature to increase. The large ground temperature buffer around housing 50 dissipates the temperature change which occurs in material 52, thus keeping the material at a relatively constant temperature. The system performs additional conditioning on the air in that dust and dirt are filtered from the air, and the humidity of the air is moderated. In the summer months when the incoming air is warm and moist the temperature reduction of the air decreases the humidity content. The excess moisture removed from the air will flow through material 52 and will pass out of housing 50 through weep holes 76 to be removed by sump 78. In the winter when cold and dry air is brought into the system it is humidified by the moisture in the ground and material 52 in housing 50. Thus, the burden of humidity control on conventional systems in the building itself is substantially reduced, again decreasing energy costs. Periodically, wash system 70 is operated to spray a disinfectant and cleansing wash on material 52, to remove dust and dirt therefrom and inhibit bacterial and fungal growth. Sump 78 removes the wash fluid from system 10. The air pulled through material 52 undergoes the temperature modifications just described, and the tempered air is then drawn through duct 80 and distributed in the building for which system 10 is provided.

The degree of temperature buffering which occurs from the present system is directly affected by the length of heat exchanger 14, by the amount of surface area of heat transfer material available for heat transfer, and by the velocity at which the air is drawn through the heat exchanger. A test system was designed and operated to provide 20 tons of cooling operating at 8,000 CFM. A generally U-shaped heat exchanger 90, having heat exchanger legs 102 and 104 each 30 feet in length and connected at the intake ends by a heat exchanger section 106 15 feet in length, as shown in FIGS. 3 and 4, was used. In the test system the air mixing and supply section 12 was connected to the heat exchanger along the base section of the generally U-shaped heat exchanger. Heat exchanger legs 102 and 104 and base section 106 consisted of housings 50 having at least a six foot top cover of ground, were approximately six feet in depth from the top of the housing, and were filled with cleanly washed four to six inch dolomite rock. During the summer months when 90° F. air was drawn into the system, the tempered air discharged from the system through distribution network 16 was consistently recorded at about 70° F. Thus, discounting the initial installation costs, the entire cost to cool air from 90° to 70° was solely that cost involved in operating air handler 84. In normal installations, comparable size air handlers may be used for underground systems as would be used for conventional central air conditioning systems. Hence, there is no increased operating cost for the present underground system over conventional air conditioners for the circulation of the air itself; however, the present system completely eliminates the need for compressors and outside fans, thus substantially reducing air conditioning costs. A system such as that just described, when operating in the winter months drawing 0° F. air into the air mixing and supply section, warms the air and provides approximately 50° air to the building. Hence 50° of warming occurs again at only the cost involved in operating air handler 84. A supplemental heat system is necessary for the building, the system will be required only to hear air from 50° F. to the desired indoor temperature. A 50° heating burden has been eliminated, with a substantial savings in money and energy.

The present underground air tempering system is virtually limitless in the volume of air which can be supplied, providing sufficient ground area is available for the installation of heat exchangers. As shown in FIG. 5 a multileg system can be used, having individual heat exchanger sections 110, 112, 114, 116, 118 and 120 which are connected on their ends by an air supply duct 122 and a distribution duct 124. The air system of a building may be zoned with separate air handlers for separate underground systems to provide air to various zones in the building. In residential installations a single straight heat exchanger, as shown in FIG. 2, will be sufficient. Any number of exchanger sections can be used as needed for the volume of air required. The shape of the heat exchanger can be than the rectangular shapes shown. For example, a round or donut shape heat exchanger with air inlet and outlet openings disposed near each other on the same side of the housing can be used.

The present tempering system works well with various other energy saving construction techniques, such as envelope building structures as shown in FIG. 6, wherein an air circulation space 130 completely surrounds the building. An outer wall 132 is fully insulated, and a fully insulated inner wall 134 is also provided on either side of space 130. Duct 80 enters the building in crawl space 136. If 50° F. air is provided continuously to space 130, and remains at about 50° as it circulates throughout the space, substantial heating burdens can be reduced within the living area of the building. Again, if for example the exterior air is 0° F. and 50° F. air is provided to space 130, the insulation in outer wall 132 will keep the temperature of the air circulating in space 130 at or relatively close to 50° F. The heating system of the building will then operate as it would if the envelope structure were not provided and the outdoor temperature were 50° F. instead of 0° F. In a typical envelope type construction, a southernly facing greenhouse 140 is provided on the building which provides the warm air for space 130. One advantage of the present underground air tempering system is that the greenhouse is not necessary, as 50° F. air can be provided from underground; thus, architects have greater latitude in designing energy efficient buildings by not being required to use the greenhouse heat supply system. Also, the present underground system is not dependent upon visible solar collectors, and will operate efficiently whether the sun shines or does not shine, even for extended periods of time. Thus, in envelope buildings utilizing the present underground air tempering system the greenhouse system can be eliminated. If a greenhouse is used, during days when the rays from the sun are relatively intense and cause substantial heating within the greenhouse, the air circulation through underground air tempering system 10 and space 130 can be effectuated solely by the thermal siphoning in the envelope structure. In these circumstances, air handler 84 need not be used, hence resulting in further energy savings. The inclusion of a greenhouse results in a system which may be either passive or active. Combining an envelope structure with the present tempering system has the additional advantage that the system need only be large enough to provide tempered air in volumes sufficient to supply space 130 and not the entire building.

Although one embodiment of an underground air tempering system has been shown and described in detail herein, with several modifications thereof, various other changes may be made without departing from the scope of the present invention.

I claim:

1. An open underground air tempering system for providing fresh makeup air to a building ventilation system from air outside the indoor building climate, comprising a heat exchanger disposed beneath the ground through which fresh outdoor air passes to be warmed during the winter and to be cooled during the summer by the ground temperature as modified by the flywheel phenomenon, said heat exchanger having a housing and heat transfer material substantially filling said housing for sufficiently increasing the surface area within said heat exchanger to transfer heat between the ground surrounding said housing and the air passing therethrough, a portion of said housing defining an air inlet opening through which the untempered fresh, outdoor air enters said heat exchanger and a second portion of said housing defining an air outlet opening through which tempered air flows from said heat exchanger, an air supply means connected to said air inlet opening for providing untempered air from said fresh, outdoor air to the tempering system, an air distribution network connected to said air outlet opening for bringing tempered air from said heat exchanger to the building ventilation system, and air circulation means for creating an air flow through said air supply means, said heat exchanger and said air distribution network.

2. An underground air tempering system as defined in claim 1 in which said heat transfer material is rock.

3. An underground air tempering system as defined in claim 1 in which the top of said heat exchanger is at least about five (5) feet below the surface of the ground.

4. An underground air tempering system as defined in claim 2 in which said heat transfer material is a plurality of liquid filled containers.

5. An underground air tempering system as defined in claim 1 in which said heat transfer material comprises substantially rounded individual pieces each between about four (4) inches to six (6) inches in diameter.

6. An underground air tempering system as defined in claim 5 in which said heat transfer material is dolomite rock.

7. An underground air tempering system as defined in claim 6 in which said heat exchanger is disposed at least about five (5) feet below the surface of the ground.

8. An underground air tempering system as defined in claim 6 in which means are provided for washing and disinfecting said dolomite rock periodically during the operation of the system.

9. An underground air tempering system as defined in claim 8 in which said means for washing and disinfecting includes a plurality of wash lines disposed within said housing at the top of said heat transfer material, a pump for supplying wash fluid to said lines, and a drainage system below said heat exchanger including weep holes in the bottom of said housing.

10. An underground air tempering system as defined in claim 7 in which said air supply means includes an air intake structure above the ground having a louvered opening for the entrance of fresh outside air, air cleansing devices disposed in said structure, and a shaft extending from said structure to said heat exchanger.

11. An underground air tempering system as defined in claim 10 in which a duct is provided for bringing exhaust air from the building ventilation system to said air intake structure, and an air mixing box is disposed in said structure for causing variable mixtures of fresh air and exhaust air to enter said heat exchanger.

12. An underground air tempering system as defined in claim 1 in which means are provided for washing and disinfecting said heat transfer material periodically during the operation of the system.

13. An underground air tempering system as defined in claim 1 in which said air supply means includes an air intake structure above the ground having an opening for the entrance of air, air cleansing devices disposed in said structure, and an air shaft extending from said structure to said heat exchanger.

14. An underground air tempering system as defined in claim 1 in which said air distribution network includes a duct from said heat exchanger to the building ventilation system and said air circulation means includes an air handler for drawing the air from said air supply means through said heat exchanger and said air distribution network into the building ventilation system.

15. An underground air tempering system as defined in claim 1 in which a plurality of said heat exchangers are interconnected by said air supply means and said air distribution network.

16. An underground air tempering system as defined in claim 15 in which each of said heat exchangers is disposed at least above five (5) feet below the surface of the ground.

17. An underground air tempering system as defined in claim 1 in which a duct is provided for bringing return air from the building ventilation system to said air supply means.

18. In an envelope building structure having inner and outer insulated walls separated by an air passageway: the improvement comprising an open underground air tempering system for providing cooled air in the summer and warmed air in the winter in the passageway, including a housing substantially filled with heat transfer material, an air supply means for bringing fresh, outdoor air to said housing for tempering the air by the ground temperature, a duct from said housing to the passageway, and air circulation means for creating an air flow through said air supply means, said housing and said duct.

19. In an envelope building structure: the improvement as defined in claim 18 in which a plurality of said housings are interconnected by said air supply means and said duct.

20. In an envelope building structure: the improvement as defined in claim 18 in which the top of said housing is at least about five (5) feet below the surface of the ground.

21. In an envelope building structure: the improvement as defined in claim 20 in which said heat transfer material comprises substantially rounded individual pieces each between about four (4) inches and six (6) inches in diameter.

22. An open heating and cooling system for a building comprising a heat exchanger disposed below the surface of the ground and containing heat transfer material being at or near constant ground temperature, an air supply means for providing fresh, outdoor air to said heat exchanger, a duct from said heat exchanger to the building, inner and outer walls defining an air passage around the building, said passage receiving air from said heat exchanger through said duct, and air circulation means for creating an air flow through said air supply means, said heat exchanger, said duct, and said passageway.

23. A heating and cooling system as defined in claim 22 in which said heat exchanger is disposed at last about five (5) feet below the surface of the ground.

24. A heating and cooling system as defined in claim 23 in which a plurality of said heat exchangers are interconnected by said air supply means and said duct.

* * * * *